United States Patent [19]

Smith, Jr. et al.

[11] Patent Number: 4,751,112
[45] Date of Patent: Jun. 14, 1988

[54] HIGH SOLIDS COATING COMPOSITIONS CONTAINING POLYCAPROLACTONE POLYOL REACTIVE DILUENTS

[75] Inventors: Donald F. Smith, Jr., Bridgewater; Glenn S. Peacock, Belle Mead; Omayra M. Salgado, Union City, all of N.J.

[73] Assignee: Union Carbide Corporation, Danbury, Conn.

[21] Appl. No.: 102,787

[22] Filed: Sep. 23, 1987

Related U.S. Application Data

[63] Continuation of Ser. No. 874,146, which is a continuation of Ser. No. 756,930, Jul. 19, 1985, abandoned, which is a continuation of Ser. No. 627,503, Jul. 9, 1984, abandoned, which is a continuation of Ser. No. 435,096, Oct. 18, 1982, abandoned.

[51] Int. Cl.$^4$ .............................................. B05D 3/021
[52] U.S. Cl. .............................. 427/388.3; 427/385.5; 525/162; 525/163
[58] Field of Search ............... 525/162, 163, 512, 518; 427/388.3, 385.5

[56] References Cited

U.S. PATENT DOCUMENTS

| | | | |
|---|---|---|---|
| 3,843,390 | 10/1974 | Hudson et al. | 117/138.8 F |
| 3,994,851 | 11/1976 | Chang | 260/29.4 R |
| 4,281,075 | 7/1981 | Chattha | 525/110 |

OTHER PUBLICATIONS

Sales literature by the Union Carbide Corporation describing diluents sold under the trademark TONE.

*Primary Examiner*—Theodore E. Pertilla
*Attorney, Agent, or Firm*—Jean B. Mauro

[57] ABSTRACT

This invention is directed to high solids coating compositions comprising a hydroxyl functional acrylic polymer, an alkylolated melamine and, as a reactive diluent, a polycaprolactone polyol, wherein the ratio of the equivalent weight of the alkylolated melamine to the total hydroxyl equivalent weight of the hydroxyl functional acrylic polymer and the polycaprolactone polyol is from about 0.8 to about 2.5. The high solids coating compositions have utility as automotive finishes, appliance finishes, general metal finishing and the like.

34 Claims, No Drawings

_HIGH SOLIDS COATING COMPOSITIONS CONTAINING POLYCAPROLACTONE POLYOL REACTIVE DILUENTS_

CROSS-REFERENCE TO RELATED APPLICATION

This is a continuation of application Ser. No. 874,146 filed June 13, 1986, now abandoned, which is a continuation of application Ser. No. 756,930 filed July 19, 1985, now abandoned, which is a continuation of application Ser. No. 627,503 filed July 9, 1984, now abandoned, which is a continuation of application Ser. No. 435,096 filed Oct. 18, 1982, now abandoned.

BRIEF SUMMARY OF THE INVENTION

1. Technical Field

This invention is directed in general to high solids coating compositions comprising a hydroxyl functional acrylic polymer, an alkylolated melamine and, as a reactive diluent, a polycaprolactone polyol.

2. Background Art

Governmental regulations have placed ever increasing restrictions on the amounts and types of organic volatiles permitted to escape into the atmosphere from coatings compositions. Considerable efforts have been expended to develop coatings compositions having a minimal amount of volatile organic components and this has led to development of powder coatings, radiation curable coatings, water borne coatings and high solids coatings. In these recent developments the amounts of organic solvents present are minimal and consequently there is little or no atmospheric pollution.

In the field of solvent coatings, efforts have been made to reduce the amount of volatile solvent present and to increase the amount of component that will remain as the coating on the substrate. At a sufficiently high concentration of such components one has what is known as a high solids coating composition. These are compositions that are applied in liquid form and dry to acceptable films without the evaporation of substantial quantities of solvents. Thus, a high solids coating composition, such as the ones hereinafter described, which would serve to lower atmospheric pollution and still produce a good satisfactory coating composition, would be of a great importance.

It has now been found as a result of the present invention that certain polycaprolactone polyols can be used as reactive diluents in a hydroxyl functional acrylic polymer-alkylolated melamine coating system to produce high solids coating compositions having desirably low amounts of volatile solvent and a lower viscosity at equivalent solids content. By employing a polycaprolactone polyol as a reactive diluent in a hydroxyl functional acrylic polymer-alkylolated melamine coating system, higher solids content coating compositions are obtained, and therefore reduced volatile content, at an equivalent viscosity. Lower viscosities are necessary for suitable application of the high solids coating compositions to a substrate, and this requirement has heretofore limited progress in high solids coating systems.

Efforts have been made in the past to discover suitable reactive diluents for high solids coating compositions. However, such efforts have generally failed due mainly to the fact that the prospective reactive diluents in high solids coating compositions may exhibit too high a volatility and also deterioration of coating properties may result from use of these reactive diluents in high solids coating systems. The polycaprolactone polyols used as reactive diluents in the high solids coating compositions of the present invention exhibit low volatility during the coating or baking processes and provide a lower viscosity at equivalent solids content, thereby facilitating application of the high solids coating compositions. The high solids coating compositions of this invention exhibit highly desirable coating properties.

DISCLOSURE OF THE INVENTION

The present invention is directed to a high solids composition comprising a hydroxyl functional acrylic polymer, an alkylolated melamine and a polycaprolactone polyol, wherein the ratio of the equivalent weight of the alkylolated melamine to the total hydroxyl equivalent weight of the hydroxyl functional acrylic polymer and the polycaprolactone polyol is from about 0.8 to about 2.5. The high solids coating compositions can optionally contain an organic solvent and a catalyst, where necessary. The high solids coating compositions are applied in a conventional manner and thermally cured to dry films. The cured coating films are useful as automotive finishes, appliance finishes, business machine finishes, coil coating, house siding, general metal finishing and the like.

The invention is further directed to a process for preparing a cured film coating comprising: (1) mixing until homogeneous a high solids composition comprising a hydroxyl functional acrylic polymer, an alkylolated melamine and a polycaprolactone polyol, wherein the ratio of the equivalent weight of the alkylolated melamine to the total hydroxyl equivalent weight of the hydroxyl functional acrylic polymer and the polycaprolactone polyol is from about 0.8 to about 2.5; (2) applying the homogeneous high solids composition as a film coating on a suitable surface; and (3) curing the film coating by baking for a period of time and at a temperature sufficient to crosslink the alkylolated melamine with the hydroxyl functional acrylic polymer and the polycaprolactone polyol. The cured film coating prepared by the above described process is also a part of this invention.

DETAILED DESCRIPTION

The hydroxyl functional acrylic polymers utilized in the high solids coating compositions of the present invention are well known to those skilled in the art and are available from several manufacturers. The hydroxyl functional acrylic polymers can contain monoethylenically unsaturated monomers having hydroxyl functionality and also other monoethylenically unsaturated monomers, and can be prepared by conventional polymerization techniques in which the monoethylenically unsaturated monomers are blended with solvents and polymerization catalysts and heated to about 100° C. to 200° C. for about 2 to 6 hours. Solvents which can be used in these conventional polymerization techniques are well known in the art and include, for example, methyl normal-amyl ketone, normal-butyl alcohol, methyl ethyl ketone and the like. Such solvents can also be used as the diluent in the high solids coating compositions, preferably at a concentration below 30 weight percent of the total weight of the coating composition so as to retain the high solids nature of the coating. Suitable polymerization catalysts include, for example, azo-bis-isobutyronitrile, benzoyl peroxide and the like. It is recognized that other hydroxyl functional polymers may be used in this invention, for example, hydroxyl functional polyesters and alkyds.

Suitable monoethyleniclly unsaturated monomers having hydroxyl functionality which can be employed in the preparation of the hydroxyl functional acrylic polymers include among others the following esters of acrylic or methacrylic acid and aliphatic dihydric alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 2-hydroxyethyl methacrylate; 3-chloro-2-hydroxypropyl methacrylate; 2-hydroxy-1-methyethyl methacrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; 7-hydroxyheptyl methacrylate; and the like. The preferred monoethylenically unsaturated monomers having hydroxyl functionality include hydroxyethyl acrylate, hydroxypropyl acrylate, hydroxyethyl methacrylate, hydroxybutyl methacrylate and hydroxypropyl methacrylate. The hydroxyl functional acrylic polymers can contain from about 5 to about 40 weight percent, preferably from about 10 to about 20 weight percent, of the monoethylenically unsaturated monomers having hydroxyl functionality.

The remainder of the monomers which can be employed in the preparation of the hydroxyl functional acrylic polymers include one or more other monoethylenicaly unsaturated monomers such as the esters of acrylic or methacrylic acid and monohydric alcohols, alpha, beta ethylenically unsaturated carboxylic acids and vinyl hydrocarbons. The hydroxyl functional acrylic polymers can contain from about 95 to about 60 weight percent, preferably from about 90 to about 80 weight percent of these other monoethylenically unsaturated monomers. Suitable esters of acrylic or methacrylic acid and monohydric alcohols include among others ethyl acrylate, butyl acrylate, isobutyl acrylate, 2-ethylhexyl acrylate, hexyl acrylate, mehyl methacrylate, ethyl methacrylate, propyl methacrylate, isopropyl methacrylate, butyl methacrylate, isobutyl methacrylate, lauryl methacrylate and the like. The preferred esters are ethyl acrylate and butyl acrylate. The esters of acrylic or methacrylic acid and monohydric alcohols can be present in the hydroxyl functional acrylic polymers in an amount of from about 95 to about 10 weight percent depending upon the particular application of the high solids coating composition. Suitable alpha, beta ethylenically unsaturated carboxylic acids include among others acrylic acid, methacrylic acid, itatonic acid, crotonic acid and the like. Preferred are acrylic acid and methacrylic acid. The alpha, beta ethylenically unsaturated carboxylic acids can be present in an amount of from about 0 to about 5 weight percent of the total polymer. Suitable vinyl hydrocarbons incude, for example, styrene, alpha methylstyrene, vinyl toluene, t-butylstyrene, chlorostyrene and the like. The preferred vinyl hydrocarbon is styrene. When vinyl hydrocarbons are employed in the preparation of the hydroxyl functional acrylic polymers, they should constitute less than 50 weight percent of the total polymer. Other monomers such as vinyl acetate, acrylonitrile, vinyl chloride, methacrylonitrile and the like can be included in the hydroxyl functional acrylic polymers in an amount of from about 0 to about 50 weight percent of the total polymer.

The hydroxyl functional acrylic polymers can have a number average molecular weight of from about 1,000 to about 30,000, preferably from about 2,000 to about 15,000. The most preferred hydroxyl functional acrylic polymers have a number average molecular weight of from 3,000 to 10,000. The hydroxyl number of the hydroxyl functional acrylic polymers can be from about 24 to about 145, preferably from about 48 to about 96. A typical hydroxyl functional acrylic polymer contains from about 5 to about 40 weight percent of a monoethylenically unsaturated monomer having hydroxyl functionality and from about 95 to about 60 weight percent of other monoethylenically unsaturated monomers. A typical hydroxyl functional acrylic polymer suitable for use in the present invention contains from 10 to 20 weight percent of hydroxyethyl acrylate, from 1 to 5 weight percent of acrylic or methacrylic acid, from 10 to 45 weight percent of butyl acrylate and from 10 to 45 weight percent of styrene as illustrated in the following reaction equation:

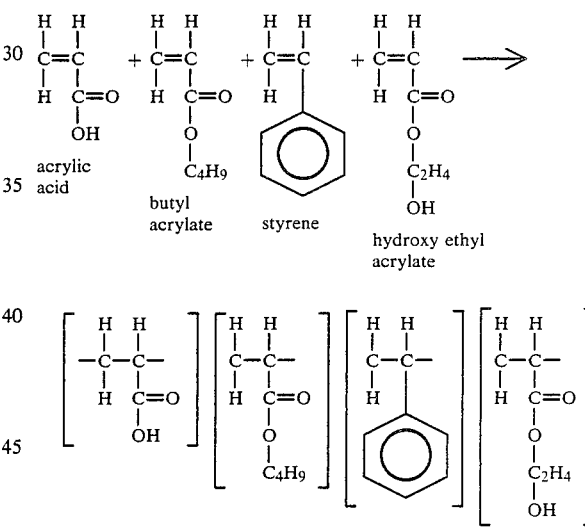

The pendant hydroxyl groups are the reacting sites for cross-linking with a suitable amino resin such as alkylolated melamine. Of course, the quantities and types of reactive monoethylenically unsaturated monomers can be varied to provide a broad range of hardness and flexibility properties in the finished coating.

The concentration of the hydroxyl functional acrylic polymer in the high solids coating compositions of this invention can be from about 5 to about 40 weight percent, preferably from about 10 to about 20 weight percent, and most preferably from about 15 to about 20 weight percent of the total weight of the high solids coating composition. As further described herein, the particular concentration of the hydroxyl functional acrylic polymer together with the alkylolated melamine and polycaprolactone polyol provides for a ratio of the equivalent weight of the alkylolated melamine to the total hydroxyl equivalent weight of the hydroxyl functional acrylic polymer and the polycaprolactone polyol ranging from about 0.8 to about 2.5, preferably from about 1.0 to about 1.8, and most preferably from about 1.3 to about 1.5.

The high solids coating compositions of this invention contain an alkylolated melamine. These compounds are well known and many are available commercially. Those suitable for use can be represented by the general formula:

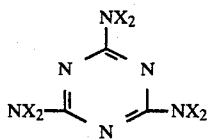

wherein X is hydrogen, hydroxyalkyl or alkoxyalkyl in any combination having from 1 to about 12 carbon atoms and provided at least two of the X substituents are alkoxyalkyl groups. The alkylolated melamines suitable for use in the high solids coating compositions of the present invention preferably contain a predominant amount of hexaalkoxyalkylmelamine. The preferred alkylolated melamines are the highly methylolated melamines, with hexamethoxymethylmelamine most preferred. Butylolated melamines can also be used in the high solids coating compositions of this invention. Other amino resins that can be used include the urea and benzoguanamine resins.

The concentration of the alkylolated melamine in the high solids coating compositions of this invention can be from about 10 to about 50 weight percent, preferably from about 20 to about 40 weight percent, and most preferably from about 25 to about 35 weight percent of the total weight of the high solids composition. The particular concentration of alkylolated melamine together with the hydroxyl functional acrylic polymer and polycaprolactone polyol provides for a ratio of the equivalent weight of the alkylolated melamine to the total hydroxyl equivalent weight of the hydroxyl functional acrylic polymer and the polycaprolactone polyol ranging from about 0.8 to about 2.5, preferably from about 1.0 to about 1.8, and most preferably from about 1.3 to about 1.5. If the alkylolated melamine concentration is too low and the equivalent ratio falls below about 0.8, the finished coatings become very soft, i.e., poor impact resistance, and exhibit poor solvent and water resistance. If the alkylolated melamine concentration is too high and the equivalent ratio rises above about 2.5, the finished coatings become very brittle due to the increased cross-linking within the coating compositions.

The polycaprolactone polyols that are blended with the alkylolated melamine and the hydroxyl functional acrylic polymer to produce the high solids compositions of this invention are any of the known polycaprolactone polyols that are commercially available and that are fully described, for example, in U.S. Pat. No. 3,169,945. As described in this patent the polycaprolactone polyols are produced by the catalytic polymerization of an excess of a caprolactone and an organic polyfunctional initiator having at least two reactive hydrogen atoms. The organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycols, and similar polyalkylene glycols, either blocked, capped or heteric, containing up to about 40 or more alkyleneoxy units in the molecule, 3 methyl-1-5-pentanediol, cyclohexanediol, 4,4'methylene-bis-cyclohexanol, 4,4'-isopropylidene bis-cyclohexanol, xylenediol, 2-(4-hydroxymethylphenyl)ethanol, 1,4-butanediol, 1,6-hexanediol and the like, triols such as glycerol, trimethylolpropane, 1,2,6-hexanetriol, triethanolamine, triisopropanolamine, and the like; tetrols such as erythritol, pentaerythritol, N,N,N',N'-tetrakis(2-hydroxyethyl)ethylene diamine, and the like.

When the organic functional initiator is reacted with the caprolactone a reaction occurs that can be repesented in its simplest form by the equation:

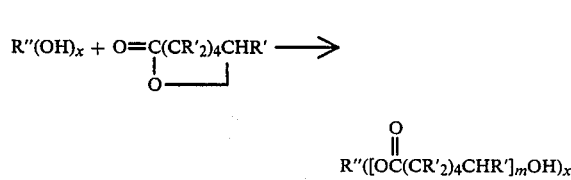

In this equation the organic functional initiator is the R''—(OH)$_x$ compound and the caprolactone is the $$O=C(CR'_2)_4CHR'$$
$$|\underline{\quad\quad O \quad\quad}|$$

compound; this can be caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 200 to about 6,000. The preferred polycaprolactone polyol compounds are those having an average molecular weight of from about 290 to about 3,000, most preferably from about 290 to 2,000. The most preferred are the polycaprolactone diol compounds having an average molecular weight of from about 290 to about 1500 and the polycaprolactone triol and tetrol compounds having an average molecular weight of from about 290 to about 2,000; these are most preferred because of their low viscosity properties. In the formula m is an integer representing the average number of repeating units needed to produce the compound having said molecular weights. The hydroxyl number of the polycaprolactone polyol can be from about 15 to 600, preferably from 200 to 500; and the polycaprolactone can have an average of from 2 to 8, preferably 2 to 4, hydroxy groups.

Illustrative of polycaprolactone polyols that can be used in the high solids coating compositions of this invention, one can mention the reaction products of a polyhydroxyl compound having an average from 2 to 6 hydroxy groups with caprolactone. The manner in which these type polycaprolactone polyols is produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compound; this figure is shown in the third column.

POLYCAPROLACTONE POLYOLS

| Initiator | Average MW of polyol | Average No. of CPL units in molecules |
|---|---|---|
| 1 Ethylene glycol | 290 | 2 |
| 2 Ethylene glycol | 803 | 6.5 |
| 3 Ethylene glycol | 2,114 | 18 |
| 4 Propylene glycol | 874 | 7 |
| 5 Octylene glycol | 602 | 4 |
| 6 Decalence glycol | 801 | 5.5 |
| 7 Diethylene glycol | 527 | 3.7 |
| 8 Diethylene glycol | 847 | 6.5 |
| 9 Diethylene glycol | 1,246 | 10 |
| 10 Diethylene glycol | 1,998 | 16.6 |
| 11 Diethylene glycol | 3,526 | 30 |
| 12 Triethylene glycol | 754 | 5.3 |
| 13 Polyethylene glycol (MW 200)* | 713 | 4.5 |
| 14 Polyethylene glycol (MW 600)* | 1,398 | 7 |
| 15 Polyethylene glycol (MW 1500)* | 2,868 | 12 |
| 16 1,2-Propylene glycol | 646 | 5 |
| 17 1,3-Propylene glycol | 988 | 8 |
| 18 Dipropylene glycol | 476 | 3 |
| 19 Polypropylene glycol (MW 425)* | 835 | 3.6 |
| 20 Polypropylene glycol (MW 1000)* | 1,684 | 6 |
| 21 Polypropylene glycol (MW 2000)* | 2,456 | 4 |
| 22 Hexylene glycol | 916 | 7 |
| 23 2-Ethyl-1,3-hexanediol | 602 | 4 |
| 24 1,5-Pentanediol | 446 | 3 |
| 25 1,4-Cyclohexanediol | 629 | 4.5 |
| 26 1,3-Bis(hydroxyethyl)-benzene | 736 | 5 |
| 27 Glycerol | 548 | 4 |
| 28 12,6-Hexanetriol | 476 | 3 |
| 29 Trimethylolpropane | 590 | 4 |
| 30 Trimethylolpropane | 750 | 5.4 |
| 31 Trimethylolpropane | 1,103 | 8.5 |
| 32 Triethanolamine | 890 | 6.5 |
| 33 Erythritol | 920 | 7 |
| 34 Pentaerythritol | 1,219 | 9.5 |

*Average molecular weight of glycol.

The structures of the compounds in the above tabulation are obvious to one skilled in the art based on the information given. The structure of compound No. 7 is:

wherein the variable r is an integer, the sum of r+r has an average value of 3.7 and the average molecular weight is 527. The structure of compound No. 20 is:

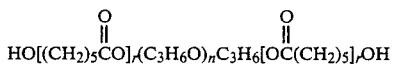

wherein the sum of r+r has an average value of 6 and the average molecular weight is 1,684. this explanation makes explicit the structural formulas of compounds 1 to 34 set forth above.

Polycaprolactone hexols suitable for use as reactive diluents in the present invention can be prepared by the catalytic polymerization of an excess of polycaprolactone polyols and a cycloaliphatic epoxide. Illustrative polycaprolactone polyols useful in the preparation of polycaprolactone hexols include polycaprolactone diols, polycaprolactone triols and the like including mixtures thereof. Many of these polycaprolactone polyols are commercially available from Union Carbide Corporation. Cycloaliphatic epoxides suitable for use in preparing the polycaprolactone hexols include 3,4-epoxycyclohexylmethyl-3,4-epoxycyclohexane carboxylate, bis(3,4-epoxycyclohexylmethyl)adipate, vinyl cyclohexane dioxide and the like. Many of these cycloaliphatic epoxides are commercially available from Union Carbide Corporation. A suitable polymerization catalyst is diethylammonium triflate which is commercially available from the 3M Company as FC-520.

A preferred method for preparation of the polycaprolactone hexols comprises adding one or more polycaprolactone triols to a reactor, heating the polycaprolactone triols to a temperature of about 100° C. and adding the catalyst using a nitrogen sparge as soon as the polycaprolactone triols are molten. The polycaprolactone triols and catalyst mixture is then heated to a temperature of from about 150° C. to about 200° C. and a cycloaliphatic epoxide is added to the mixture. The reaction is carried out for about one hour to about three hours or until the oxirane content has been reduced to almost a nil value. A modification of this process can involve initially adding all of the ingredients into the reactor. A further modification of this method can involve a vacuum treatment of from 10 to 30 minutes after the catalyst addition and/or the use of a vacuum during the heating of the polycaprolactone triols to a molten state. The above process is especially preferred for preparation of Polyol VIII and Polyol IX utilized in the working examples hereinafter. Preferred polycaprolactone hexols suitable for use as reactive diluents in the present invention have an average molecular weight of from about 600 to about 1500.

The polycaprolactone polyols act as reactive diluents in the high solids coating compositions of this invention. The polycaprolactone polyols can react with the alkylolated melamine which in turn cross-links with the hydroxyl functional acrylic polymers to provide high solids coating compositions having reduced viscosity at equivalent solids, thereby facilitating the application of the high solids coating compositions. By employing the polycaprolactone polyols as reactive diluents in hydroxyl functional acrylic polymer-alkylolated melamine coating systems, higher solids coating compositions are obtained, and therefore reduced volatiles, at an equivalent viscosity.

The polycaprolactone polyols utilized in the high solids coating compositions of this invention can be mixtures of polycaprolactone polyols. For example, when utilizing polycaprolactone hexols which provide increased crosslinking in the film coatings and thus greater hardness, it may be desirable to mix or blend a polycaprolactone diol with the polycaprolactone hexol which can result in greater flexibility in the film coatings. Other polycaprolactone polyol mixtures may similarly be used as reactive diluents if desired.

The concentration of the polycaprolactone polyols in the high solids coating compositions of this invention can be from 1 to 50 weight percent, preferably from 5 to 30 weight percent, and most preferably from 8 to 22 weight percent of total weight of the high solids coating composition. Again, the particular concentration of polycaprolactone polyol together with the hydroxyl functional acrylic polymer and alkylolated melamine provides for a ratio of the equivalent weight of alkylolated melamine to the total hydroxyl equivalent weight of the hydroxyl functional acrylic polymer and the polycaprolactone polyol ranging from about 0.8 to about 2.5, preferably from about 1.0 to about 1.8 and most preferably from about 1.3 to about 1.5.

The high solids coating compositions can also contain an organic solvent and a catalyst as optional components. Any of the conventional solvents used in the coatings industry can be used at a concentration preferably below 30 weight percent of the total weight of the coating composition. While larger amounts count conceivably be used, the use of larger amounts would estroy the high solids nature of the coating; solvents are generally added in the small amounts indicated to improve flowability during application of the coating composition to the substrate.

In some instances an acid catalyst might be desired to improve the efficiency of the melamine crosslinking reaction during curing. The concentration of the catalyst can vary from zero to about 10 weight percent based on the total weight of the coating composition. The particular catalyst used and its concentration are dependent to a degree upon its catalytic activity and the specific components present in the coating composition. These catalysts are known to those skilled in the art and include hydrochloric acid, sulfuric acid, p-toluene sulfonic acid, methane sulfonic acid, dodecylbenzene sulfonic acid, phosphoric acid and its alkyl derivatives, maleic acid, trimellitic acid, phthalic acid, succinic acid, and the like.

The high solids coating compositions can also contain pigments, fillers, and other additives conventionally present in coating compositions in their conventional quantities. The particular ones selected are of no consequence to the basic invention. In preparing the high solids coating compositions, the ingredients are mixed by the conventional procedures used in the production of paints, inks or coating compositions. These procedures are so well known to those skilled in the art that they do not require further discussion here.

The high solids coating compositions are applied to a surface or substrate by conventional means and then thermally cured by heating at a temperature of about 100° C. to 375° C. preferably from 150° C. to 200° C. for a period of time sufficient to obtain a dry film. Generally, this time will range from about one minute to several hours, preferably from one minute to 2 hours. The components present in a particular high solids coating composition will determine the temperature and time that will be required to obtain an adequate cure and a good film coating.

The coating compositions of this invention are high solids coating compositions and they can contain as much as 90 weight percent or more solids therein. Generally the total solids content of the coatings compositions of this invention range from about 25 to 90 weight percent, preferably from about 50 to 90 weight percent, of the total weight of the coating composition.

The coating compositions were evaluated according to the following procedures:

Volatile Organic Compounds (VOC): a one gram sample of a coating composition was weighed into a tared aluminum dish which was then placed in an air circulating oven for 30 minutes at 300° F. The percent weight loss was considered the amount of volatile organic compounds present in the coating composition and the residue was considered as the solids content of the coating composition.

Viscosity: a Brookfield Viscometer Model RVT was used to measure the viscosity of the coating compositions. The measurements in centipoise were made at 50 revolutions per minute at 23° C.

Solvent Resistance: a measure of the resistance of the cured film to attack by methylethyl ketone (MEK) and was reported as the number of rubs or cycles of methylethyl ketone soaked cheesecloth required to remove one half of a cured film from the test area. The test was performed by stroking the cured film with a methylethyl ketone soaked cheesecloth until that amount of film coating was removed. The number of cycles required to remove this amount of coating was a measure of the coating solvent resistance.

Pencil Hardness: pencil leads of increasing hardness values were forced against the film coating surface in a precisely defined manner until one pencil lead marred the surface of the film coating. The surface hardness was considered as the hardest pencil grade which just failed to mar the film coating surface. The pencil leads in order of softest to hardest were reported as follows: 6B, 5B, 4B, 3B, 2B, B, HB, F, H, 2H, 3H, 4H, 5H, 6H, 7H, 8H and 9H.

Forward Impact Resistance: a measure of the ability of a cured film coating to resist rupture from a falling weight. A Gardner Impact Tester Model IG-1120 using an eight pound dart was used to test film coatings cast and cured on steel panels. The dart was raised to a given height in inches and dropped onto the coated side of the coated steel panel. The inches times pounds, designed inch-pounds, absorbed by the film without rupturing was recorded as the films forward impact resistance.

Conical Mandral Flexibility: test film coatings cast and cured on steel panels were conditioned at 0° C. and −18° C. for four hours and then wrapped around a conical mandral having a diameter ranging from 3/16 inches to ¾ inches. The coated side of the steel panels were away from the conical mandral. If the film coating failed by cracking at ¾ inches, it was rated as "fail". No cracking of the film coating at 3/16 inches was rated as "pass".

The following examples are illustrative of the present invention and are not intended as a limitation upon the scope thereof. As used in the examples appearing hereinafter, the following designations, terms and abbreviations have the indicated meanings:

cps: centipoise in./lbs.: inch/pounds

°C.: Centigrade degree

AM/OH Eq. Wt. Ratio: The ratio of the equivalent weight of alkylolated melamine to the total hydroxyl equivalent weight of the hydroxyl functional acrylic polymer and the polycaprolactone polyol.

HFAP I: A hydroxyl functional acrylic polymer having 74 to 76 weight percent solids, a hydroxyl number of 86 and commercially available from Rohm and Haas Company as Acryloid ® AT-400.

MM I: A methylolated melamine commercially available from American Cyanamid Company as Cymel ® 303.

MM II: A methylolated melamine commercially available from American Cyanamid Company as Cymel ® 325.

Polyol I: A polycaprolactone diol having an average molecular weight of 530, an average hydroxyl number of 212 and commercially available from Union Carbide Corporation as PCP-0200.

Polyol II: A polycaprolactone diol having an average molecular weight of 830, an average hydroxyl number of 135 and commercially available from Union Carbide Corporation as PCP-0210.

Polyol III: A polycaprolactone diol having an average molecular weight of 1250, an average hydroxyl number of 90 and commercially available from Union Carbide Corporation as PCP-0230.

Polyol IV: A polycaprolactone triol having an average molecular weight of 540, an average hydroxyl number of 310 and commercially available from Union Carbide Corporation as PCP-0300.

Polyol V: A polycaprolactone triol having an average molecular weight of 300, an average hydroxyl number of 560 and commercially available from Union Carbide Corporation as PCP-0301.

Polyol VI: A polycaprolactone triol having an average molecular weight of 900, an average hydroxyl number of 187 and commercially available from Union Carbide Corporation as PCP-0310.

Polyol VII: A polycaprolactone tetrol prepared according to the procedure described in U.S. Pat. No. 3,169,945 and having an average molecular weight of 621 and a hydroxyl number of 361.

Polyol VIII: A polycaprolactone hexol prepared by adding 2,775 grams of Polyol V, 1,014 grams of 3,4-epoxycyclohexylmethyl-3,4-epoxycyclohexane carboxylate commercially available from Union Carbide Corporation, and 1.89 grams of diethylammonium triflate catalyst commercially available from 3M Company to a reaction flask and heating to 180° C. under a nitrogen blanket for 2 hours. The resulting polycaprolactone hexol product had an average molecular weight of 800 and a hydroxyl number of 312.

Polyol IX: A polycaprolactone hexol prepared by adding 450 grams of Polyol V, 540 grams of Polyol IV, 274 grams of 3,4-epoxycyclohexylmethyl-3,4-epoxycyclohexane carboxylate commercially available from Union Carbide Corporation and 3.8 grams of diethylammonium triflate catalyst commercially available from 3M Company to a reaction flask and heating to 150° C. under a nitrogen blanket for 1.5 hours. The resulting polycaprolactone hexol product had an average molecular weight of 900 and a hydroxyl number of 325.

EXAMPLES 1 THROUGH 6 AND COMPARATIVE EXAMPLE A

A series of coating compositions were prepared in Examples 1 through 6 containing 93 grams of HFAP I having 75 weight percent non-volatiles, 33 grams of MM I having 100 weight percent non-volatiles. 30 grams of a polycaprolactone polyol having 100 weight percent non-volatiles specified for each example in Table A below, 34 grams of methyl normal-amyl ketone and 0.33 grams of paratoluenesulfonic acid. A coating composition designated as Comparative Example A was also prepared containing 100 grams of HFAP I having 75 weight percent non-volatiles, 25 grams of MM I having 100 weight percent non-volatiles, 43 grams of methyl normal-amyl ketone and 0.25 grams of paratoluenesulfonic acid. All of the coating compositions were mixed until homogeneous and then applied to Bonderite 100 ® treated steel panels using a drawdown blade with a 5 mil film clearance. The coating films were air dried for about one hour and then cured by baking for 30 minutes at 300° F. The cured coating films were thereafter aged for three days at ambient temperature before testing for the specific properties designated in Table A. The results of the testing are given in Table A.

TABLE A

| POLYCAPROLACTONE POLYOLS IN HYDROXYL FUNCTIONAL ACRYLIC POLYMER-ALKYLOLATED MELAMINE COATING SYSTEMS | | | | | | | |
|---|---|---|---|---|---|---|---|
| EXAMPLE | A | 1 | 2 | 3 | 4 | 5 | 6 |
| Polycaprolactone Polyol Identification | None | Polyol I | Polyol II | Polyol III | Polyol IV | Polyol VII | Polyol VIII |
| AM/OH Eq. Wt. Ratio | 1.36 | 1.06 | 1.35 | 1.96 | 0.83 | 1.34 | 1.34 |
| Volatile Organic Compounds, weight percent | 35.2 | 32.9 | 32.0 | 32.5 | 32.0 | 37.0 | 32.5 |
| Viscosity, cps | 450 | 252 | 274 | 284 | 310 | 198 | 278 |
| Solvent Resistance, rubs | >100 | >100 | >100 | >100 | >100 | >100 | >100 |
| Pencil Hardness | HB | HB | HB | HB | HB | HB | HB |
| Forward Impact Resistance, in./lbs. | 20 | 40 | 55 | 80 | 70 | 25 | 35 |

Table A shows the properties obtained when a particular polycaprolactone polyol is added to a hydroxyl functional acrylic polymer-alkylolated melamine coating system at constant concentration. The viscosities of the polycaprolactone polyol modified formulations of Examples 1 through 6 are significantly lower than the viscosity of comparative Example A which was not modified with a polycaprolactone polyol. The examples in Table A show that impact resistance is increased and hardness and solvent resistance are unaffected by the addition of polycaprolactone polyols to hydroxyl functional acrylic polymer-alkylolated melamine coating system.

EXAMPLES 7 THROUGH 18 AND COMPARATIVE EXAMPLE B

A series of coating compositions were prepared in Examples 7 through 18 containing an amount of HFAP I having 75 weight percent non-volatiles specified for each example in Table B below, an amount of MM I having 100 weight percent non-volatiles specified for each example in Table B, an amount of a polycaprolactone polyol having 100 weight percent non-volatiles specified for each example in Table B, an amount of methyl normal-amyl ketone specified for each example in Table B and an amount of paratoluenesulfonic acid specified for each example in Table B. A coating composition designated as Comparative Example B was also prepared containing 100 grams of HFAP I having 75 weight percent non-volatiles, 25 grams of MM I having 100 weight percent non-volatiles, 29 grams of methyl normal-amyl ketone and 0.25 grams of paratoluenesulfonic acid. All of the coating compositions were mixed until homogeneous and then applied to Bonderite 100 ® treated steel panels using a drawdown blade with a five mil clearance. The coating films were air dried for about one hour and then cured by baking for 30 minutes at 300° F. The cured coating films were thereafter aged for three days at ambient temperature before testing for the specific properties designated in Table B. The results of the testing are given in Table B. A dash indicates that no test was performed.

II having 80 weight percent non-volatiles specified for each example in Table C, an amount of a polycaprolactone polyol or a polycaprolactone polyol mixture having 100 weight percent non-volatiles specified for each

TABLE B

EFFECT OF VARYING POYLCAPROLACTONE POLYOL CONCENTRATION IN A HYDROXYL FUNCTIONAL ACRYLIC POLYMER-ALKYLOLATED MELAMINE COATING SYSTEM

| EXAMPLE | B | 7 | 8 | 9 | 10 | 11 | 12 | 13 | 14 | 15 | 16 | 17 | 18 |
|---|---|---|---|---|---|---|---|---|---|---|---|---|---|
| HFAP I, grams | 100 | 120 | 107 | 93 | 120 | 107 | 93 | 120 | 107 | 93 | 120 | 107 | 93 |
| MM I, grams | 25 | 29 | 32 | 36 | 31 | 38 | 44 | 45 | 58 | 70 | 43 | 53 | 63 |
| Polycaprolactone Polyol Identification | None | Polyol I | Polyol I | Polyol I | Polyol IV | Polyol IV | Polyol IV | Polyol VIII | Polyol VIII | Polyol VIII | Polyol IX | Polyol IX | Polyol IX |
| Polycaprolactone Polyol, grams | 0 | 10 | 20 | 30 | 10 | 20 | 30 | 10 | 20 | 30 | 10 | 20 | 30 |
| Methyl Normal-Amyl Ketone, grams | 29 | 39 | 44 | 50 | 51 | 67 | 55 | 48 | 58 | 69 | 47 | 55 | 65 |
| Paratoluenesulfonic Acid, grams | 0.25 | 0.29 | 0.32 | 0.36 | 0.31 | 0.38 | 0.44 | 0.45 | 0.58 | 0.70 | 0.43 | 0.53 | 0.63 |
| AM/OH Eq. Wt. Ratio | 1.36 | 1.36 | 1.36 | 1.36 | 1.36 | 1.36 | 1.36 | 1.36 | 1.36 | 1.36 | 1.36 | 1.36 | 1.36 |
| Viscosity, cps | 410 | 268 | 208 | 152 | 260 | 194 | 162 | 400 | 350 | 340 | 400 | 340 | 300 |
| Solvent Resistance, rubs | >100 | — | — | — | — | — | — | >100 | 100 | 100 | 100 | 100 | 100 |
| Pencil Hardness | HB | — | — | — | — | — | — | 2H | 3H | 4H | 2H | 3H | 3H |
| Forward Impact Resistance, in./lbs. | 25 | 30 | 40 | 40 | 30 | 40 | 40 | — | — | — | — | — | — |

Table B shows the effect of replacing 10, 20 and 30 weight percent of the HFAP I with either Polyol I, Polyol IV, Polyol VIII or Polyol IX while maintaining an AM/OH equivalent weight ratio of 1.36. The viscosities of the polycaprolactone polyol modified formulations of Examples 7 through 12 are significantly lower and the viscosities of the polycaprolactone polyol modified formulations of Examples 13 through 18 are comparatively lower than the viscosity of comparative Example B which was not modified by a polycaprolactone polyol. Examples 7 through 12 show that impact resistance is increased by the addition of polycaprolactone polyols to hydroxyl functional acrylic polymer-alkylolated melamine coating systems. Pencil hardness is increased and solvent resistance unaffected by the use of Polyol VIII and Polyol IX in the coating formulations of Examples 13 through 18.

EXAMPLES 19 THROUGH 32 AND COMPARATIVE EXAMPLES C AND D

A series of coating compositions were prepared in Examples 19 through 32 containing an amount of HFAP I having 75 weight percent non-volatiles specified for each example in Table C below, an amount of MM I having 100 weight percent non-volatiles or MM II having 80 weight percent non-volatiles specified for each example in Table C, an amount of a polycaprolactone polyol or a polycaprolactone polyol mixture having 100 weight percent non-volatiles specified for each example in Table C, an amount of methyl normal-amyl ketone specified for each example in Table C and an amount of paratoluenesulfonic acid specified for each example in Table C. No paratoluenesulfonic acid was added to examples in which MM II was present as an ingredient. Two coating compositions designated as Comparative Examples C and D were also prepared containing an amount of HFAP I having 75 weight percent non-volatiles specified for each example in Table C, an amount of MM I having 100 weight percent non-volatiles or MM II having 80 weight percent non-volatiles specified for each example in Table C, an amount of methyl normal-amyl ketone specified for each example in Table C and an amount of paratoluenesulfonic acid specified for each example in Table C. All of the coating compositions were mixed until homogeneous and then applied to Bonderite 100 ® treated steel panels using a drawdown blade with a five mil clearance. The coating films were air dried for about one hour and then cured by baking for 30 minutes at 300° F. The cured coating films were thereafter aged for three days at ambient temperature before testing for the specific properties designated in Table C. The results of the testing are given in Table C. A dash indicates that no test was performed.

TABLE C

HYDROXYL FUNCTIONAL ACRYLIC POLYMER-ALKYLOLATED MELAMINE COATING SYSTEMS MODIFIED WITH POLYCAPROLACTONE POLYOLS AND POLYCAPROLACTONE POLYOL MIXTURES

| EXAMPLE | C | 19 | 20 | 21 | 22 | 23 | 24 | 25 |
|---|---|---|---|---|---|---|---|---|
| HFAP I, grams | 100 | 107 | 107 | 131 | 93 | 131 | 93 | 107 |
| MM I, grams | 25 | 0 | 0 | 67 | 135 | 63 | 126 | 0 |
| MM II, grams | 0 | 43 | 37 | 0 | 0 | 0 | 0 | 57 |
| Polycaprolactone Polyol Identification | None | Polyol I | Polyol II | Polyol VIII | Polyol VIII | Polyol IX | Polyol IX | Polyol I/Polyol VIII |
| Polycaprolactone Polyol, grams | 0 | 20 | 20 | 15 | 30 | 15 | 30 | 10/10 |
| Methyl Normal-Amyl Ketone, grams | 29 | 50 | 47 | 44 | 103 | 42 | 99 | 58 |
| Paratoluenesulfonic Acid, grams | 0.25 | 0 | 0 | 0.67 | 1.35 | 0.63 | 1.26 | 0 |
| AM/OH Eq. Wt. Ratio | 1.36 | 1.36 | 1.36 | 1.36 | 1.36 | 1.36 | 1.36 | 1.36 |
| Viscosity, cps | — | — | — | — | — | — | — | — |
| Conical Mandral Flexibility, ⅛ inch to 3/16 inch | | | | | | | | |
| 0° C. | Fail | Pass | Pass | Fail | Fail | Fail | Fail | Pass |

TABLE C-continued
HYDROXYL FUNCTIONAL ACRYLIC POLYMER-ALKYLOLATED MELAMINE COATING SYSTEMS MODIFIED WITH POLYCAPROLACTONE POLYOLS AND POLYCAPROLACTONE POLYOL MIXTURES

| −18° C. | Fail | Pass | Pass | Fail | Fail | Fail | Fail | Fail |
|---|---|---|---|---|---|---|---|---|
| EXAMPLE | 26 | D | 27 | 28 | 29 | 30 | 31 | 32 |
| HFAP I, grams | 107 | 133 | 93 | 107 | 93 | 107 | 93 | 107 |
| MM I, grams | 0 | 0 | 0 | 0 | 0 | 0 | 0 | 0 |
| MM II, grams | 45 | 41 | 57.5 | 52.5 | 55 | 51 | 52.5 | 50 |
| Polycaprolactone Polyol Identification | Polyol II/ Polyol IX | None | Polyol II/ Polyol VIII | Polyol II/ Polyol VIII | Polyol II/ Polyol VIII | Polyol II/ Polyol VIII | Polyol II/ Polyol VIII | Polyol II/ Polyol VIII |
| Polycaprolactone Polyol grams | 10/10 | 0 | 20/10 | 13.3/6.7 | 22.5/7.5 | 15/5 | 24.9/5.1 | 16.6/3.4 |
| Methyl Normal-Amyl Ketone, grams | 50 | 16 | 28 | 23 | 28 | 23 | 27 | 23 |
| Paratoluenesulfonic Acid, grams | 0 | 0 | 0 | 0 | 0 | 0 | 0 | 0 |
| AM/OH Eq. Wt. Ratio | 1.36 | 1.36 | 1.36 | 1.36 | 1.36 | 1.36 | 1.36 | 1.36 |
| Viscosity, cps | — | 1810 | 680 | 960 | 620 | 940 | 560 | 960 |
| Conical Mandral Flexibility, ⅛ inch to 3/16 inch | | | | | | | | |
| 0° C. | Pass | Pass | Pass | Pass | Pass | Pass | Pass | Pass |
| −18° C. | Pass | Fail | Pass | Pass | Pass | Pass | Pass | Pass |

Table C shows that the low temperature flexibility of hydroxyl functional acrylic polymer-alkylolated melamine coating systems modified by polycaprolactone hexols is greatly enhanced by employing a polycaprolactone hexol-diol mixture in the place of a polycaprolactone hexol alone. The viscosities of the polycaprolacetone hexol-diol mixture modified formulations of Examples 27 and 32 are significantly lower than the viscosity of comparative Example D which was not modified with a polycaprolactone hexol-diol mixture.

What is claimed is:

1. A process for preparing a cured film coating comprising:
   (1) mixing until homogeneous a high solids composition comprising a hydroxyl functional acrylic polymer, an alkylolated melamine and a polycaprolactone polyol, wherein the polycaprolactone polyol is a combination of a polycaprolactone hexol and at least one member of the group consisting of a polycaprolocatone diol and a polycaprolactone triol, and wherein the homogeneous high solids composition has a ratio of the equivalent weight of the alkylolated melamine to the total hydroxyl equivalent weight of the hydroxyl functional acrylic polymer and said polycaprolactone polyol from about 1.0 to about 1.8,
   (2) applying the homogeneous high solids composition as a film coating on a suitable surface and
   (3) curing said film coating by baking for a period of time and at a temperature sufficient to crosslink the alkylolated melamine with the hydroxyl functional acrylic polymer and the polycaprolactone polyol.

2. The process of claim 1 wherein said film coating is cured by baking at a temperature of from 100° C. to 375° C. for about one minute to about 2 hours.

3. The process of claim 2 wherein said ratio is from 1.3 to 1.5.

4. The process of claim 2 wherein said polycaprolactone polyol is a combinatin of polycaprolactone hexol and polycaprolactone diol having a weight ratio of polycaprolactone hexol to polycaprolactone diol from about 1:1 to about 4:9:1.

5. A high solids composition comprising:
from about 50 to about 90 weight percent solids,
a hydroxyl functional acrylic polymer,
a alkylolated melamine and
a polycaprolactone polyol, wherein the polycaprolactone polyol is a combination of a polycaprolactone hexol and at least one of the group consisting of a polycaprolocatone diol and a polycaprolactone triol, and having a ratio of the equivalent weight of the alkylolated melamine to the total hydroxyl equivalent weight of the hydroxyl functional acrylic polymer and the polycaprolactone polyol is from about 1.0 to about 1.8.

6. The composition of claim 5 wherein the hydroxyl functional acrylic polymer is present at a concentration from about 5 to about 40 weight percent; the alkylolated melamine is present at a concentration from about 10 to about 50 weight percent, and the polycaprolactone polyol is present at a concentration from about 1 to about 50 weight percent based on the total weight of the composition.

7. The composition of claim 6 wherein the hydroxyl functional acrylic polymer contains residue of a monoethylenically unsaturated monomer having hydroxyl functionality and at least one other monoethylenically unsaturated monomer.

8. The composition of claim 2 wherein the hydroxyl functional acrylic polymer contains residue of a monoethylenically unsaturated monomer having hydroxyl functionality, an ester of acrylic or methacrylic acid and a monohydric alcohol, an alpha, beta-ethylenically unsaturated carboxylic acid and a vinyl hydrocarbon.

9. The composition of claim 7 wherein the alkylolated melamine has the formula:

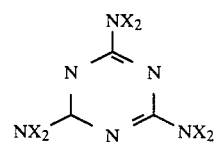

wherein X is separately at each occurrence hydrogen, hydroxyalkyl having from 1 to about 12 carbon atoms or alkoxyalkyl having from about 2 to about 12 carbon atoms, provided at least two of the X substituents are said alkoxyalkyl groups.

10. The composition of claim 9 wherein the alkylolated melamine contains hexamethoxymethylmelamine.

11. The composition of claim 9 wherein said polycaprolactone polyol has an average molecular weight from about 200 to about 6000.

12. The composition of claim 11 wherein said polycaprolactone polyol contains polycaprolactone diol having an average molecular weight from about 290 to about 1500.

13. The composition of claim 11 wherein said polycaprolactone polyol contains polycaprolactone triol having an average molecular weight from about 290 to about 2000.

14. The composition of claim 11 wherein said polycaprolactone polyol contains polycaprolactone hexol having an average molecular weight from about 600 to about 1500.

15. The composition of claim 12 wherein said polycaprolactone polyol contains polycaprolactone hexol having an average molecular weight from about 600 to about 1500.

16. The composition of claim 13 wherein said polycaprolactone polyol contains polycaprolactone hexol having an average molecular weight from about 600 to about 1500.

17. The composition of claim 5 wherein said polycaprolactone polyol has an average molecular weight from about 200 to about 6000, and wherein said ratio is from 1.3 to 1.5.

18. The composition of claim 17 wherein said ratio is about 1.4.

19. The composition of claim 17 wherein the hydroxyl functional acrylic polymer is present at a concentration from about 5 to about 40 weight percent, the alkylolated melamine is present at a concentration from about 10 to about 50 weight percent and said polycaprolactone polyol is present at a concentration from about 1 to about 50 weight percent based on the total weight of the composition.

20. The composition of claim 19 wherein the hydroxyl functional acrylic polymer contains residue of a monoethylenically unsaturated monomer having hydroxyl functionality and at least one other monoethylenically unsaturated monomer.

21. The composition of claim 19 wherein the hydroxyl functional acrylic polymer contains residue of a monoethylenically unsaturated monomer having hydroxyl functionality, an ester of acrylic or methacrylic acid and a monohydric alcohol, an alpha, beta-ethylenically unsaturated carboxylic acid and a vinyl hydrocarbon.

22. The composition of claim 20 wherein the alkylolated melamine has the formula:

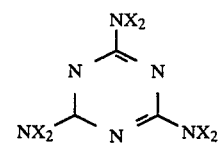

wherein X is separately at each occurrence hydroxyalkyl having from 1 to about 12 carbon atoms or alkoxyalkyl having from 2 to about 12 carbon atoms, provided at least two of the X substituents are said alkoxyalkyl groups.

23. The composition of claim 20 wherein the alkylolated melamine contains hexamethoxymethylmelamine.

24. The composition of claim 20 wherein said polycaprolactone polyol contains polycaprolactone diol having an average molecular weight from about 290 to about 1500.

25. The composition as claimed in claim 20 wherein said polycaprolactone polyol contains polycaprolactone triol having an average molecular weight from about 290 to about 2000.

26. The composition of claim 22 wherein said polycaprolactone polyol contains polycaprolactone hexol having an average molecular weight from about 600 to about 1500.

27. The composition of claim 24 wherein said polycaprolactone polyol contains polycaprolactone hexol having an average molecular weight from about 600 to about 1500.

28. The composition of claim 25 wherein said polycaprolactone polyol contains polycaprolactone hexol having an average molecular weight from about 600 to about 1500.

29. The composition of claim 5 which is cured and which has substantial low temperature flexibility.

30. The composition of claim 17 which is cured and which has substantial low temperature flexibility.

31. The composition of claim 5 wherein said polycaprolocatone polyol is a combination of polycaprolactone hexol and polycaprolactone diol.

32. The composition of claim 31 having a weight ratio of polycaprolactone hexol to polycaprolactone diol from about 1:1 to about 4:9:1.

33. The composition of claim 17 wherein said polycaprolactone polyol is a combination of polycaprolactone hexol and polycaprolactone diol.

34. The composition of claim 33 having a weight ratio of polycaprolactone hexol to polycaprolactone diol from about 1:1 to about 4:9:1.

* * * * *